(12) United States Patent
Nakamura et al.

(10) Patent No.: US 7,333,298 B2
(45) Date of Patent: Feb. 19, 2008

(54) MAGNETIC HEAD ACTUATOR AND MAGNETIC DISK DRIVE USING THE SAME

(75) Inventors: Hajime Nakamura, Takefu (JP); Takehisa Minowa, Takefu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 354 days.

(21) Appl. No.: 11/004,861

(22) Filed: Dec. 7, 2004

(65) Prior Publication Data
US 2005/0122629 A1 Jun. 9, 2005

(30) Foreign Application Priority Data
Dec. 8, 2003 (JP) ............................. 2003-408829

(51) Int. Cl.
*G11B 5/56* (2006.01)
(52) U.S. Cl. ................................................. 360/294.6
(58) Field of Classification Search ............... 360/294.6
See application file for complete search history.

(56) References Cited

U.S. PATENT DOCUMENTS

| | | | |
|---|---|---|---|
| 5,936,805 A * | 8/1999 | Imaino .................... | 360/294.5 |
| 6,046,888 A * | 4/2000 | Krinke et al. ............ | 360/294.4 |
| 6,078,473 A | 6/2000 | Crane et al. | |
| 6,198,606 B1 | 3/2001 | Boutaghou et al. | |
| 6,295,185 B1 | 9/2001 | Stefansky | |
| 6,362,939 B1 | 3/2002 | Crane et al. | |
| 6,414,822 B1 | 7/2002 | Crane et al. | |
| 6,600,634 B1 | 7/2003 | Kim et al. | |
| 6,614,627 B1 * | 9/2003 | Shimizu et al. ......... | 360/294.4 |
| 2002/0017830 A1 | 2/2002 | Ikeda et al. | |

(Continued)

FOREIGN PATENT DOCUMENTS

EP 1225644 A2 7/2002

(Continued)

OTHER PUBLICATIONS

Fan et al., IEEE Transactions on Magnetics, vol. 35, No. 2, Mar. 1999, pp. 1000-1005.

(Continued)

*Primary Examiner*—A. J. Heinz
(74) *Attorney, Agent, or Firm*—Birch, Stewart, Kolasch & Birch, LLP

(57) ABSTRACT

In conjunction with a magnetic disk drive unit comprising a voice coil motor (14), an arm (12) extending from the motor, a magnetic head actuator (2) mounted at a distal end of the arm, a suspension (16) coupled to the actuator, and a magnetic head slider mounted on the suspension at its distal end, the magnetic head actuator (2) comprises a stator section (30) secured to the arm distal end, an attachment section (18) secured to the arm distal end together with the stator section, micro-beams (20, 22) extending from the attachment section, a rotor section (24) supported for swing motion by the micro-beams, a permanent magnet (32) disposed in the stator section, and a coil (28) disposed in the rotor section. Electric current is conducted through the coil in the magnetic field created by the permanent magnet for causing the micro-beams to be displaced for inducing swing motion of the suspension secured to the rotor section and the magnetic head slider mounted thereon.

13 Claims, 11 Drawing Sheets

U.S. PATENT DOCUMENTS

2002/0051326 A1    5/2002    Shiraishi et al.
2002/0096944 A1    7/2002    Crane et al.
2002/0181140 A1    12/2002    Subrahmanyan

FOREIGN PATENT DOCUMENTS

JP    2004-213818 A    7/2004
JP    2004-213819 A    7/2004
JP    2004-213820 A    7/2004

OTHER PUBLICATIONS

Koganezawa et al., IEEE Transactions on Magnetics, vol. 35, No. 2, Mar. 1999, pp. 988-992.
Koganezawa et al., IEEE Transactions on Magnetics, vol. 32, No. 5, Sep. 1996, pp. 3908-3910.

* cited by examiner

MAGNETIC HEAD ACTUATOR AND MAGNETIC DISK DRIVE USING THE SAME

CROSS-REFERENCE TO RELATED APPLICATION

This non-provisional application claims priority under 35 U.S.C. §119(a) on Patent Application No. 2003-408829 filed in Japan on Dec. 8, 2003, the entire contents of which are hereby incorporated by reference.

TECHNICAL FIELD

This invention relates to a magnetic disk drive unit, and more particularly, to a magnetic head actuator for use therein.

BACKGROUND ART

The magnetic disk drive unit adapted for writing and reading of data on a rotating ferromagnetic medium, i.e., magnetic disk by scanning a magnetic head thereon is widely used in the modern information society as the major storage device. The magnetic head is carried on a slider, which is kept afloat on the magnetic disk with a gap of the nanometer order during the writing/reading operation. A drive force for moving the magnetic head to a selected position is typically produced by a voice coil motor (VCM). The voice coil motor includes a coil which is coupled to a pivoted arm, which is coupled to a magnetic head slider via a suspension including a load beam and a gimbal. The load beam is a spring for generating a load in balance with the float quantity of the slider. The gimbal is a spring for supporting the slider and allowing for elastic deformation in planes other than the plane parallel to the disk surface, for accommodating disk axial run-outs and inclinations associated with assembly without detracting from the tracking fidelity. This structure permits the magnetic head to be moved to the selected track on the rotating disk while maintaining a stable state.

Recent efforts are being made to increase the recording density of magnetic disk drive units to a higher level and hence, to reduce the track width. Since the magnetic head must be accurately positioned to such a narrow track, there is a need for improving the precision of head positioning. In the prior art, the head positioning is performed solely by large actuators such as voice coil motors as mentioned above, which lack sufficient precision to comply with the narrowing of track width. For high recording density disk drive units, high precision positioning mechanisms or micro-actuators are essentially needed.

In JP-A 2004-213818, 2004-213819 and 2004-213820, the inventors proposed a micro-actuator capable of high precision positioning utilizing electromagnetic force. In the micro-actuator, two plate springs, referred to as micro-beams, are used to couple rotor and stator sections. The micro-beams are formed integrally with the gimbal of the suspension, by bending.

Each micro-beam is of generally rectangular shape having a high aspect ratio and has a reduced gage in a tracking direction and an increased gage in a perpendicular direction, i.e., the direction in which the suspension load beam applies a load to the magnetic head slider. Then the micro-beams support the rotor for allowing swing motion of the rotor in the tracking direction and maintains high stiffness in the load direction. A permanent magnet and a coil are disposed in the rotor and stator sections, respectively, to construct a second stage of voice coil motor for achieving controlled high-precision positioning in the track transverse direction. The type of this micro-actuator is referred to as "slider drive type," hereinafter, because the slider is driven via the gimbal.

As a result of performance improvement, the magnetic disk drive unit now finds wide-spreading applications in various fields including video image recording apparatus and car navigation systems. For small-size magnetic disk drives using magnetic disks having a diameter of less than 2.5 inches, studies have been made to incorporate them in portable equipment including digital still cameras, video cameras and audio players, and some are used in practice. In such applications, the impact resistance of the drive unit is important. Possible countermeasures for impact safe-guard, now under research and development, include a weight reduction of the overall drive unit, a casing having a damping structure, a size reduction and shape design of the slider, and a controlled structure for avoiding impact.

In the slider drive type micro-actuator the inventors previously proposed, the micro-beams are dimensioned about 0.03 mm by about 0.005 mm in cross section and are sometimes prone to deformation by strong impact. The micro-beams can be ruggedized and stiffened by increasing their cross-sectional area, but the spring constant of micro-beams in the tracking direction is also increased, posing a need to increase the volume of permanent magnet and coil. Simply increasing the weight of the suspension distal end, however, results in a lower resonance frequency and an increased inertia moment, which make the control by the coarse-adjustment actuator difficult, failing to increase the precision of head positioning by two stage actuators. For this reason, it is difficult to apply the slider drive type micro-actuator to portable recording equipment.

The references pertinent to the technology of the present invention include U.S. Pat. No. 6,295,185; U.S. Pat. No. 6,078,473; Fan et al., IEEE TRANSACTIONS ON MAGNETICS, Vol. 35, No. 2, March 1999, pp. 1000-1005; Koganezawa et al., IEEE TRANSACTIONS ON MAGNETICS, Vol. 35, No. 2, March 1999, pp. 988-992; and Koganezawa et al., IEEE TRANSACTIONS ON MAGNETICS, Vol. 32, No. 5, September 1996, pp. 3908-3910.

SUMMARY OF THE INVENTION

In conjunction with a magnetic disk drive unit comprising a voice coil motor, an arm extending from the motor, a magnetic head actuator mounted at a distal end of the arm, a suspension coupled to the actuator, and a magnetic head slider mounted on the suspension at its distal end, an object of the invention is to provide a magnetic head actuator mounted at a distal end of the arm of the voice coil motor for driving the overall suspension, which actuator can be increased in size, permits micro-beams to be increased in cross-sectional area, and is resistant to impact.

In a first aspect, the invention provides a magnetic head actuator in a magnetic disk drive unit, which is mounted at a distal end of an arm extending from a voice coil motor, and coupled to a suspension having a magnetic head slider mounted at its distal end for providing swing motion of the slider. The actuator comprises a stator section secured to the arm distal end, an attachment section secured to the arm distal end together with the stator section, metallic micro-beams extending from the attachment section and shaped by bending, a rotor section supported for swing motion by the micro-beams, a permanent magnet disposed in the stator or rotor section, and a coil disposed in the rotor or stator section. Electric current is conducted through the coil in the magnetic field created by the permanent magnet for causing the micro-beams to be displaced for inducing swing or arcuate motion of the suspension secured to the rotor section and the magnetic head slider mounted thereon.

In a preferred embodiment, a pair of the micro-beams are disposed at opposite sides of the rotor section for supporting the suspension and the magnetic head slider via the rotor section, and the micro-beams are flexible enough to be displaced by a drive force developed between the stator and rotor sections in a tracking direction on the magnetic disk, but highly stiff in other directions.

In a preferred embodiment, each micro-beam includes at least one fold.

In a preferred embodiment, the micro-beams are formed integrally with the arm attachment section and the rotor section. In an alternative preferred embodiment, the suspension includes a load beam section, and the micro-beams are formed integrally with the arm attachment section, the rotor section and the load beam section.

Preferably, the stator section is made of a ferromagnetic material. More preferably, the stator section is formed integrally with the arm which is made of a ferromagnetic material. Also preferably, the rotor section is made of a ferromagnetic material.

Typically, the actuator further includes an auxiliary yoke opposed to the stator section for forming a magnetic circuit, with the rotor section being interposed between the auxiliary yoke and the stator section.

In a preferred embodiment, the arm from the voice coil motor is provided at its distal end with two sets of the micro-beams, rotor sections and suspensions which are symmetrically arranged so as to interpose the arm between the sets, and the arm is provided at its distal end with one stator section.

In a second aspect, the invention provides a magnetic disk drive unit comprising a voice coil motor for rotating a pivot shaft, a voice coil motor arm having a proximal end pivoted to the pivot shaft and a distal end, a magnetic head actuator fixedly secure to the distal end of the arm, a suspension coupled to the actuator and including a load beam and gimbal, and a slider mounted on the suspension at its distal end and having a magnetic head carried thereon, the voice coil motor operating to pivotally move the arm for positioning the slider at a selected track on a magnetic disk. The magnetic head actuator comprises a member including an attachment section secured to the arm distal end, micro-beams and a rotor section where a coil or a permanent magnet is disposed, a stator section where a permanent magnet or a coil is disposed, and an auxiliary yoke, the permanent magnet, the stator section, and the auxiliary yoke forming a magnetic circuit, the permanent magnet and the coil being opposed to define a small gap therebetween and within the magnetic circuit. The micro-beams are integrally formed with the arm attachment section of the member at laterally opposed edges and stand along the edges at right angles toward the stator section. When electricity is conducted across the coil in the magnetic field created by the permanent magnet, the rotor section is arcuately moved by Lorentz forces in a lateral direction, so that the suspension and the magnetic head-carrying slider are also arcuately moved together with the rotor section.

Specifically, the member including the arm attachment section, micro-beams and rotor section is prepared by furnishing a blank in which the attachment section and the rotor section are bridged at laterally opposed sides by strips, folding inside the strips at a first intermediate point an angle of about 180° so that the rotor section overlies the attachment section, then folding back the strips at a second intermediate point an angle of about 180° so that the rear edge of the rotor section is situated close to the front edge of the attachment section, and finally folding the strips along their longitudinal inner side at right angles toward the stator section.

The magnetic head actuator of the invention is of simple structure, capable of accurate positioning, highly reliable, and impact resistant. The simple structure ensures increased productivity of magnetic head actuator.

BRIEF DESCRIPTION OF THE DRAWINGS

Throughout the drawings, like parts are designated by the same numerals and their description is omitted in later embodiments.

DESCRIPTION OF THE PREFERRED EMBODIMENTS

Figure 1:
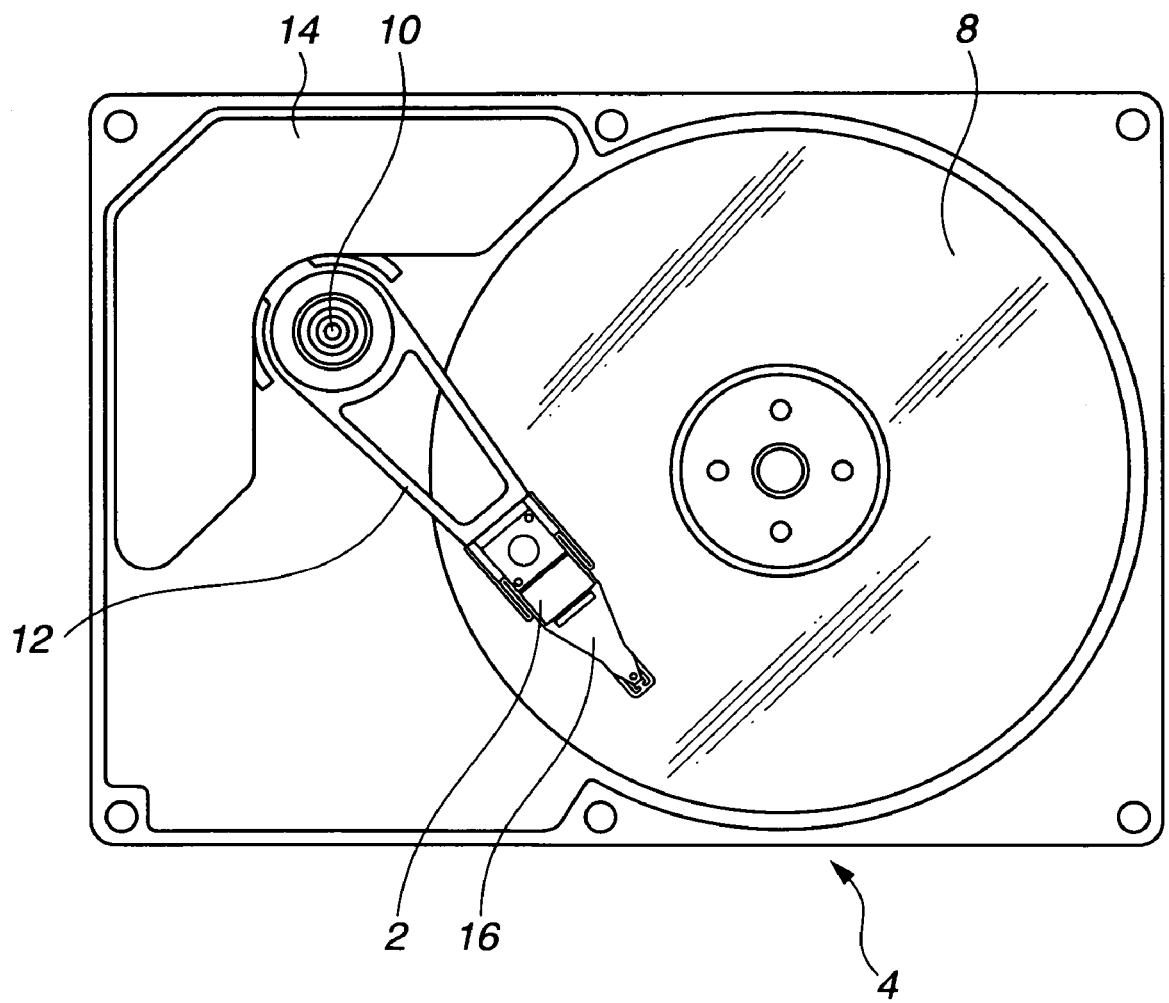
FIG. 1 is a plan view of a magnetic head actuator in a first embodiment of the invention.

FIG. 1 illustrates in plan view an exemplary magnetic disk drive unit 4 comprising a magnetic head actuator 2 according to the invention. In the illustrated embodiment, a coarse-adjustment actuator for positioning a magnetic head slider (not shown) at a selected track on a magnetic disk 8 is constructed by a voice coil motor (VCM) 14 having a VCM arm 12 which is mounted to a rotating pivot shaft 10 for rotation about the shaft 10. A suspension 16 has a load beam which is attached to a distal end of the VCM arm 12 via the magnetic head actuator 2 of the invention.

Figure 2:
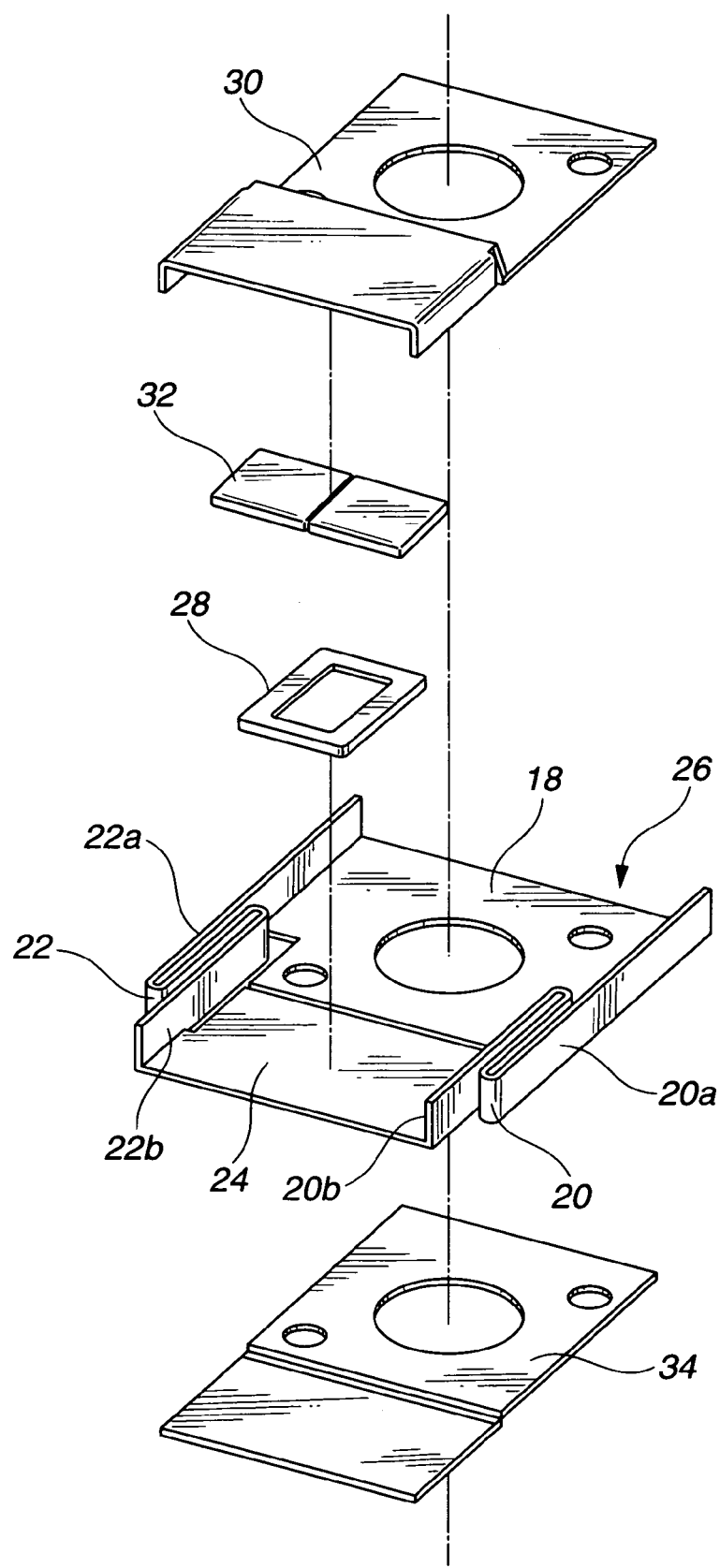
FIG. 2 is a perspective exploded view of the magnetic head actuator in the first embodiment of the invention.

FIG. 2 is a perspective exploded view of the magnetic head actuator 2 according to a first embodiment of the invention. For the sake of clarity, wires for supplying electric power to a coil are not shown. The magnetic head actuator 2 includes a stator member or section 30, a member 26, and an optional yoke 34. The member 26 includes an attachment section 18 to be secured to the distal end of the VCM arm 12, micro-beams 20 and 22, and a rotor section 24. To the rotor section 24 is attached a coil 28. Disposed in the stator section 30 is a permanent magnet 32. The stator section 30 is preferably made of a ferromagnetic material for helping form a magnetic circuit. The auxiliary yoke 34 made of a ferromagnetic material may be attached, if necessary, for enhancing the efficiency of the magnetic circuit. The member 26 (which includes the arm attachment section 18, the micro-beams 20 and 22, and the rotor section 24), the stator section 30, and the auxiliary yoke 34 are assembled and secured to the VCM arm (not shown in FIG. 2) by means of stakes, screws, rivets, welds or the like.

Specifically in the member 26 which includes the arm attachment section 18, the micro-beams 20 and 22, and the rotor section 24, the micro-beams 20 and 22 are juxtaposed and integrally formed at laterally opposed edges of the arm attachment section 18 and stand along the edges at right angles toward the stator section 30. More specifically, as described later in conjunction with FIG. 6, the micro-beams 20 and 22 are formed by furnishing elongated strips 20a, 22a extending forward from the front side of the arm attachment section 18 at opposed edges, folding the strips 20a, 22a inside an angle of 180° to form a first fold, then folding the strips inside an angle of 180° at a position backward of the attachment section front side to form a second fold (in the reverse direction to the first fold) and provide the last portions of the strips 20a, 22a which extend forward again. The rotor section 24 is integrally formed through transition portions 20b, 22b with the last forward extending portions of the strips 20a, 22a.

Figure 3:
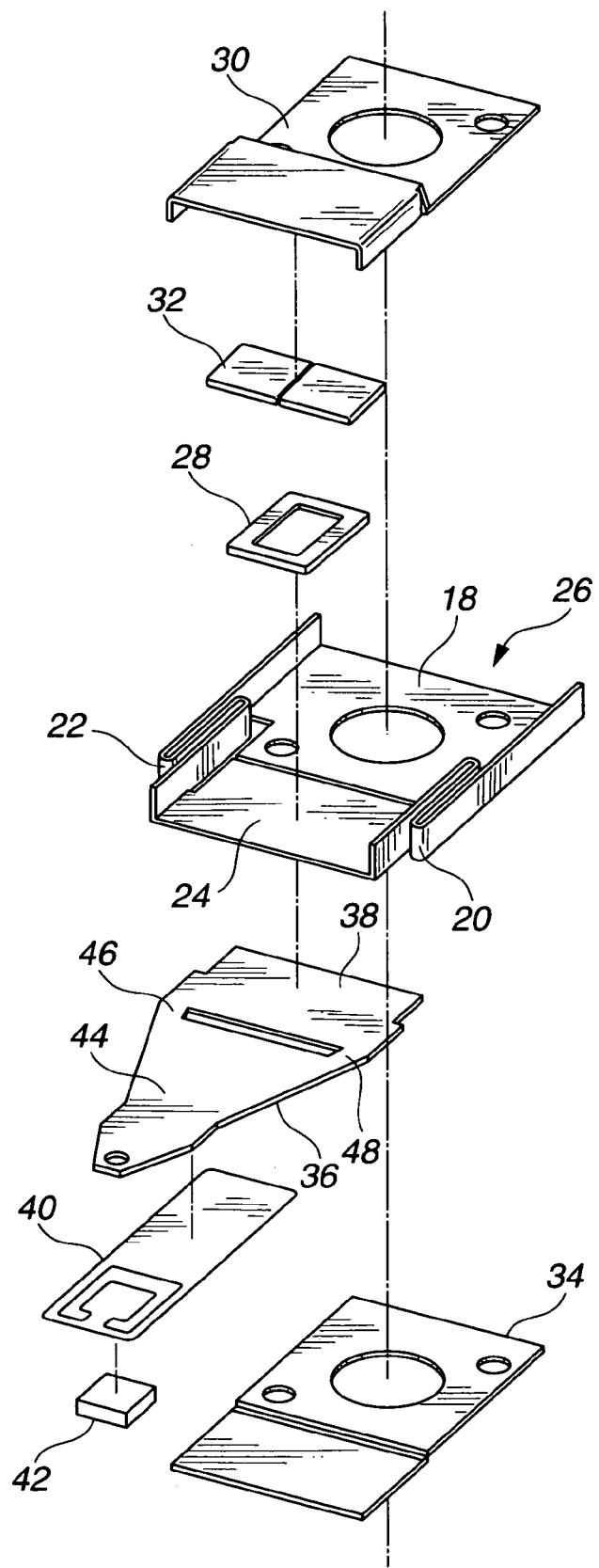
FIG. 3 is a perspective exploded view showing one exemplary arrangement of a magnetic head actuator, a suspension and a magnetic head slider in the first embodiment of the invention.

Referring to FIG. 3, to the rotor section 24, not only the coil 28 is attached, but an attachment section 38 of a load beam 36 of the suspension is also secured as by welding. The suspension 16 (see FIG. 1) includes the load beam 36 and a gimbal 40. The suspension 16 also has a slider 42 mounted at its distal end, the slider having a magnetic head (not shown) for reading and writing of data on the magnetic disk. Since the VCM 14 is operated such that the arm 12 is rotated about the pivot shaft 10, the slider 42 at the distal end of the suspension 16 can be roughly moved to the selected track on the magnetic disk 8. For simplicity's sake, signal lines to the magnetic head are not depicted.

Figure 4:
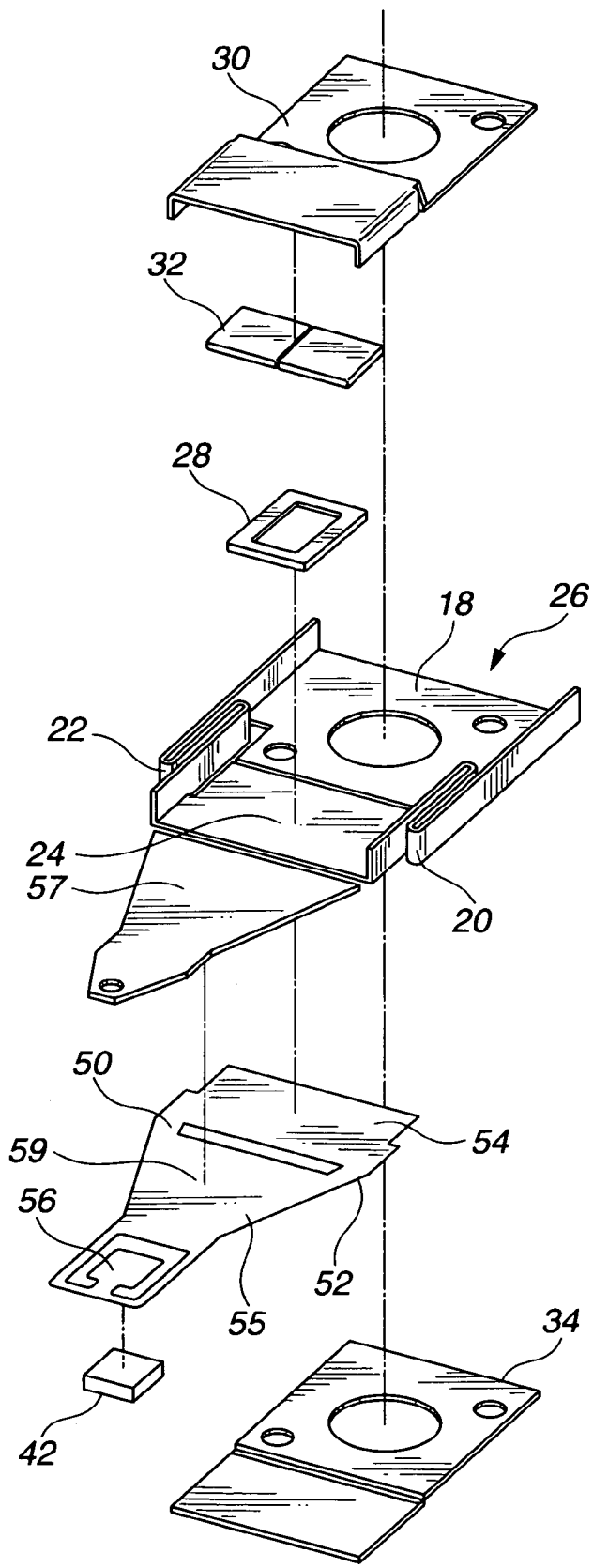
FIG. 4 is a perspective exploded view showing another exemplary arrangement of a magnetic head actuator, a suspension and a magnetic head slider in the first embodiment of the invention.

FIG. 4 illustrates another arrangement of the suspension. As opposed to the load beam 36 shown in FIG. 3 in which a load-applying section 44 is integrally formed with flexure sections 46, 48 and the rotor attachment section 38, the embodiment of FIG. 4 is designed such that flexure sections 50, 52 and a rotor attachment section 54 form an integral member 55 with a gimbal 56. Instead, a load beam 57 is attached to an intermediate load beam attachment section 59 of the member 55 as by welding. Further the rotor attachment section 54 of the member 55 is attached to the rotor section 24 by adhesive bonding, welding or the like.

Figure 5:
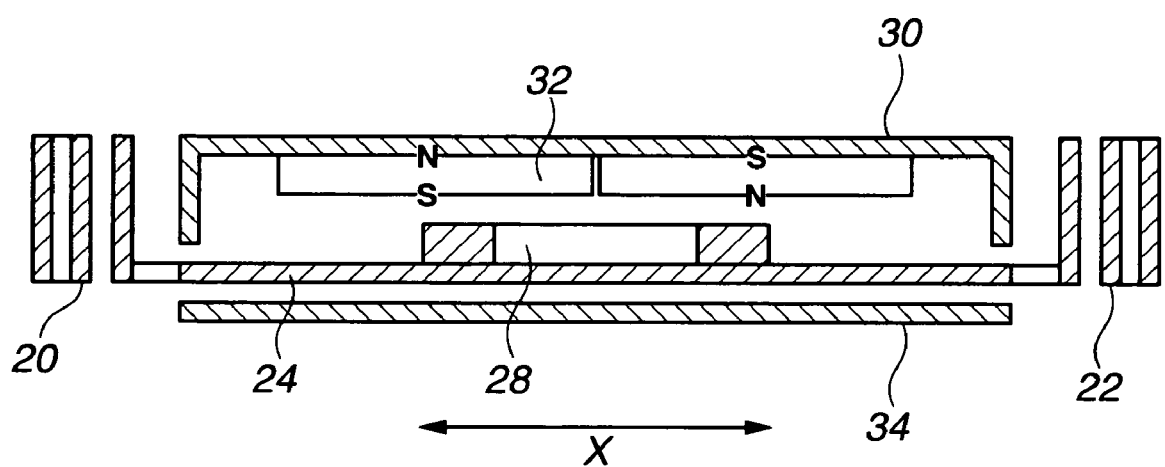
FIG. 5 is a cross-sectional view of the stator and rotor sections in the first embodiment.

In the magnetic head actuator in one embodiment of the invention, in which a magnetic circuit is constructed by the permanent magnet 32 attached near the distal end of the VCM arm, the stator section 30 and the auxiliary yoke 34, the permanent magnet 32 and the coil 28 secured to the rotor section 24 are opposed to maintain a small gap therebetween. As shown in FIG. 5, the permanent magnet is magnetized in a direction perpendicular to the plane of the opposed coil, to provide two magnetic poles which are laterally arranged as viewed from the front side of the slider. Instead, two singularly magnetized permanent magnets may be juxtaposed. The permanent magnet 32 is dimensioned to a magnetic pole area of 3 to 10 mm$^2$ and a thickness of 0.1 to 1 mm in the magnetizing direction. The permanent magnet 32 creates magnetic forces which largely affect the drive force of the magnetic head actuator of the invention. To produce sufficient magnetic forces with the above-described dimensions, the use of high strength rare earth magnets, typically Nd—Fe—B sintered magnets is preferred.

The stator section 30 and the auxiliary yoke 34 are made of a ferromagnetic material such as steel and have a gage of about 0.05 to 0.25 mm. The permanent magnet 32 is The coil 28 is made using a copper wire or a printed wiring board. The coil 28 is wound so as to generate a magnetic field perpendicular to the magnetic pole plane of the opposed permanent magnet 32. When the printed wiring board is used, a multilayer wiring board may be used depending on the necessary magnetic force or drive force. The coil 28 is secured to the rotor section 24 using an epoxy adhesive or the like. Power supply lines (not shown) to the coil 28 are secured to the VCM arm distal end while it is kept loose so as not to interfere with swing motion of the magnetic head actuator.

The member 26 including the VCM arm attachment section 18, micro-beams 20, 22 and rotor section 24 is made of a steel-base flat spring and has a gage of about 0.025 to 0.15 mm. It is preferable to use non-ferromagnetic steel for the purpose of not disturbing the magnetic fields produced by the magnetic circuit (30, 32, 34) and the coil 28.

As best shown in FIG. 2, a pair of micro-beams 20, 22 are extended from the VCM arm attachment section 18 toward the rotor section 24, once folded back toward the VCM arm attachment section 18, and folded again toward the rotor section 24 where they support the rotor section 24. This double-folded structure exerts the same effect as the arrangement of three beams on each side, that is, provides increased resilience in the drive direction of the magnetic head actuator and maintains high stiffness against back and forth motion in a vertical direction, as compared with a single beam. To obtain predetermined resilience and translation stiffness, the number of folds may be only one or three or more.

As shown in FIG. 5, the drive of the magnetic head actuator of the invention is of the same basic structure as the VCM 14 which is a coarse-adjustment actuator. By conducting electricity across the coil 28 in the magnetic field created by the permanent magnet 32, the rotor section 24 is arcuately moved by Lorentz forces in the direction of arrow X, and the suspension 16 and the magnetic head-carrying slider 42 integrated therewith are also arcuately moved.

Figure 6A:
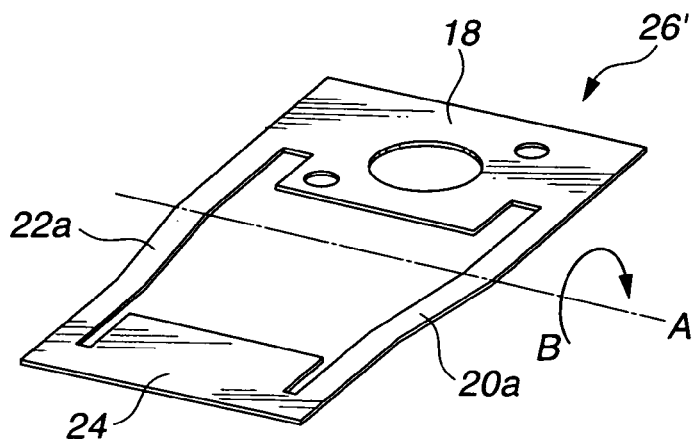
FIG. 6 illustrates the process of working a blank into a member including an arm attachment section, micro-beams and a rotor section.
Figure 6B:
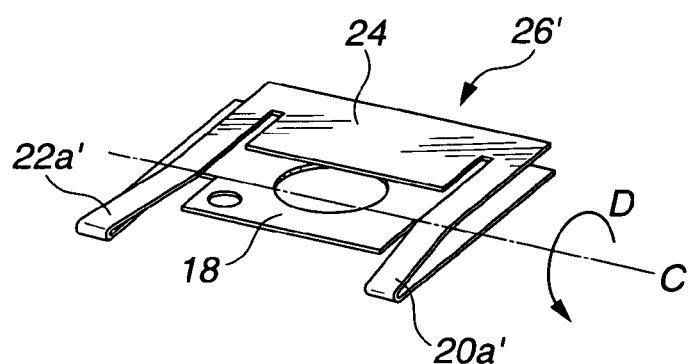
Figure 6C:
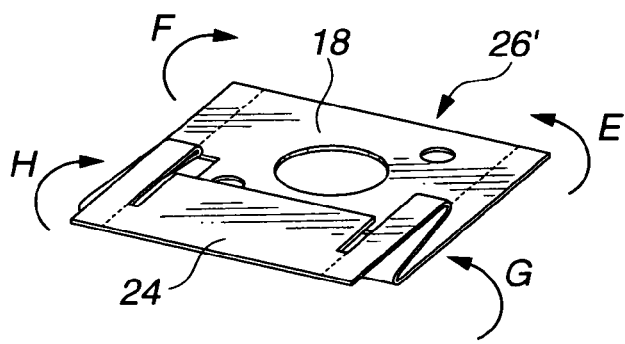
Figure 6D:
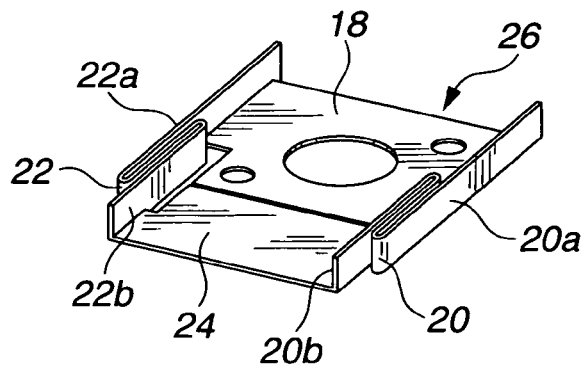

Like the load beam or gimbal of the suspension in the prior art VCM, the micro-beams 20, 22 are prepared by punching out a thin blank by pressing or etching, followed by bending. FIG. 6 illustrates the working and shaping process. The member 26 including the VCM arm attachment section 18, micro-beams 20, 22 and rotor section 24 is prepared by first punching a configured blank 26' out of a thin plate by pressing or etching, the blank 26' being configured such that the attachment section 18 and the rotor section 24 are bridged or connected at laterally opposed sides by side strips 20a, 22a as shown in FIG. 6a. The side strips 20a, 22a at first intermediate points depicted by line A are folded an angle of about 180° as shown by arrow B, so that the rotor section 24 overlies the attachment section 18 as shown in FIG. 6b. Then the side strips 20a', 22a' at second intermediate points depicted by line C are folded back an angle of about 180° as shown by arrow D, so that the rear or inside edge of the rotor section 24 is situated close to the front or inside edge of the attachment section 18 as shown in FIG. 6c. Finally, the side strips 20a, 22a are folded along their longitudinal inner side at right angles as shown by arrows E, F, G and H in FIG. 6c, completing the member 26 as shown in FIG. 6d.

The order of folding is not limited to the above embodiment. The side strips may be previously provided with notches at fold lines to facilitate successive working steps.

Also the stator section 30 and the auxiliary yoke 34 are prepared by punching out a thin blank by pressing or etching, followed by bending.

Figure 7:
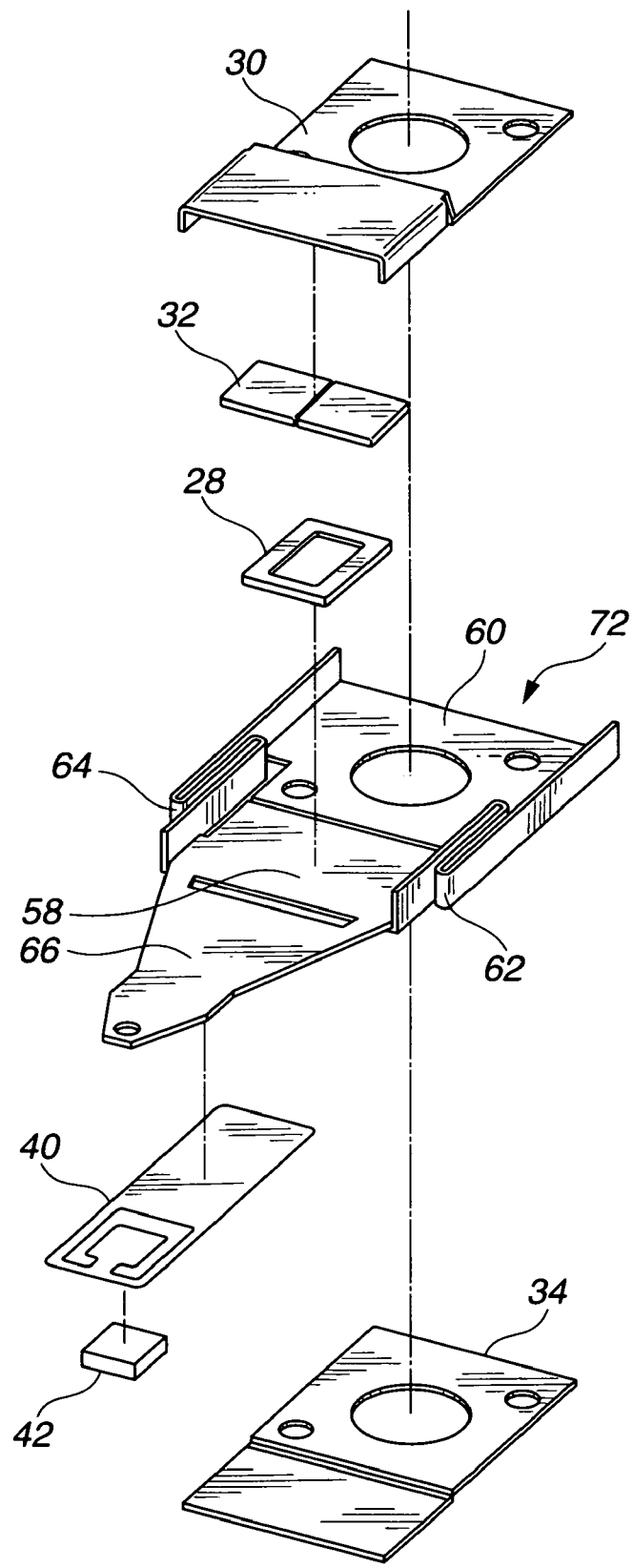
FIG. 7 is a perspective exploded view of a magnetic head actuator in a second embodiment of the invention.

FIG. 7 is a perspective exploded view of the magnetic head actuator according to a second embodiment of the invention. In the second embodiment, a rotor section 58 is provided at its distal end with a load beam section 66 of the suspension. That is, the VCM arm attachment section 60, micro-beams 62, 64, rotor section 58 and suspension load beam section 66 are combined as an integral member 72, reducing the number of parts.

Figure 8:
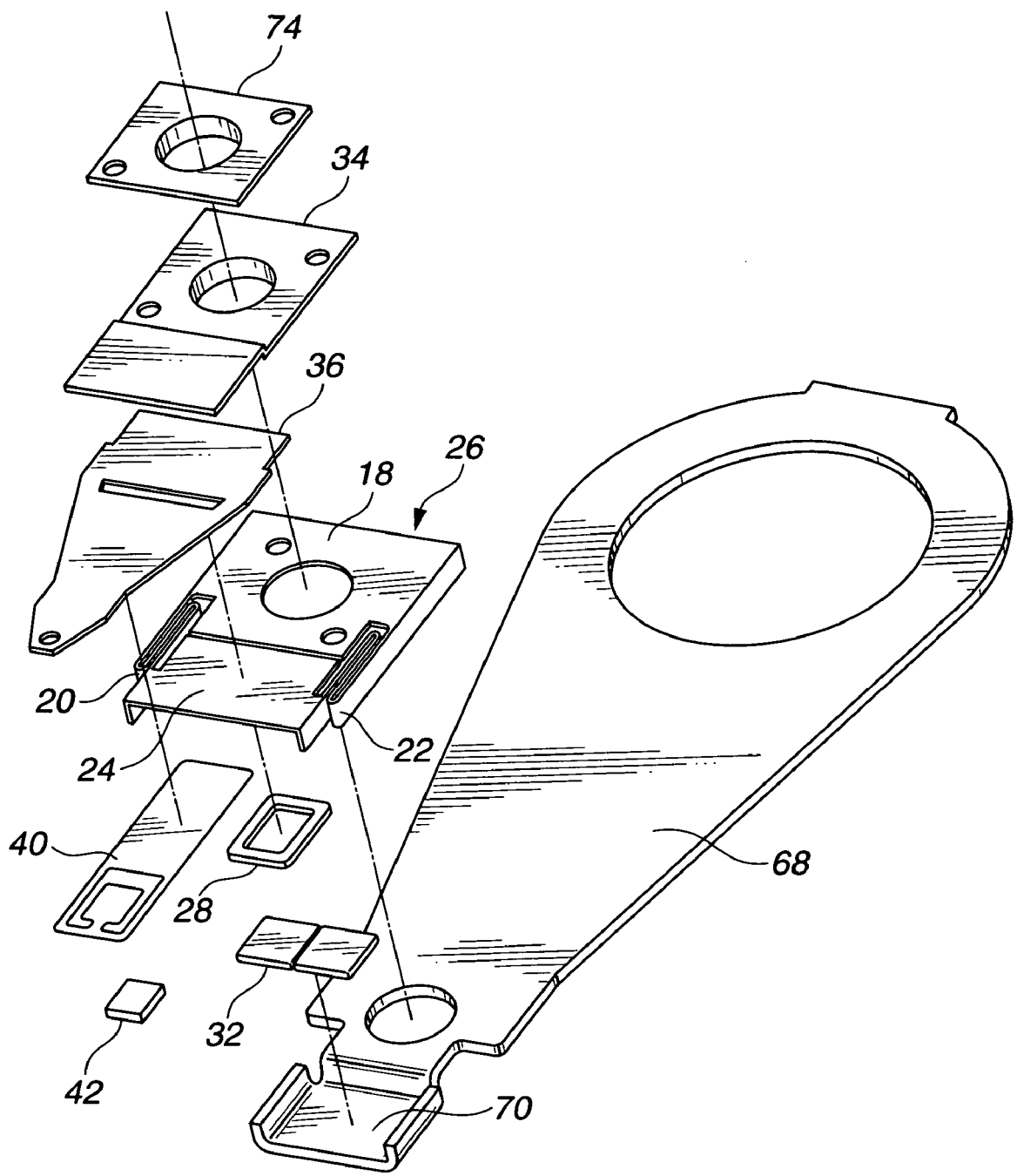
FIG. 8 is a perspective exploded view of a magnetic head actuator in a third embodiment of the invention.

FIG. 8 is a perspective exploded view of the magnetic head actuator according to a third embodiment of the invention. In the third embodiment, the VCM arm 68 is integrally provided at its distal end with a stator section 70. In the third embodiment, the VCM arm 68 may be made of a ferromagnetic material for forming a magnetic circuit efficiently. If desired, the member 26 including the VCM arm attachment section 18, micro-beams 20, 22 and rotor section 24 may be replaced by the member 72 having a suspension load beam section integrated therewith as described in the second embodiment. The member 26 including the VCM arm attachment section 18, micro-beams 20, 22 and rotor section 24, the stator section 30, and the auxiliary yoke 34 are secured to the VCM arm 68 by means of a caulking stake 74. The securing means is not limited to caulking, and screws, rivets, welds or the like may be used.

Figure 9:
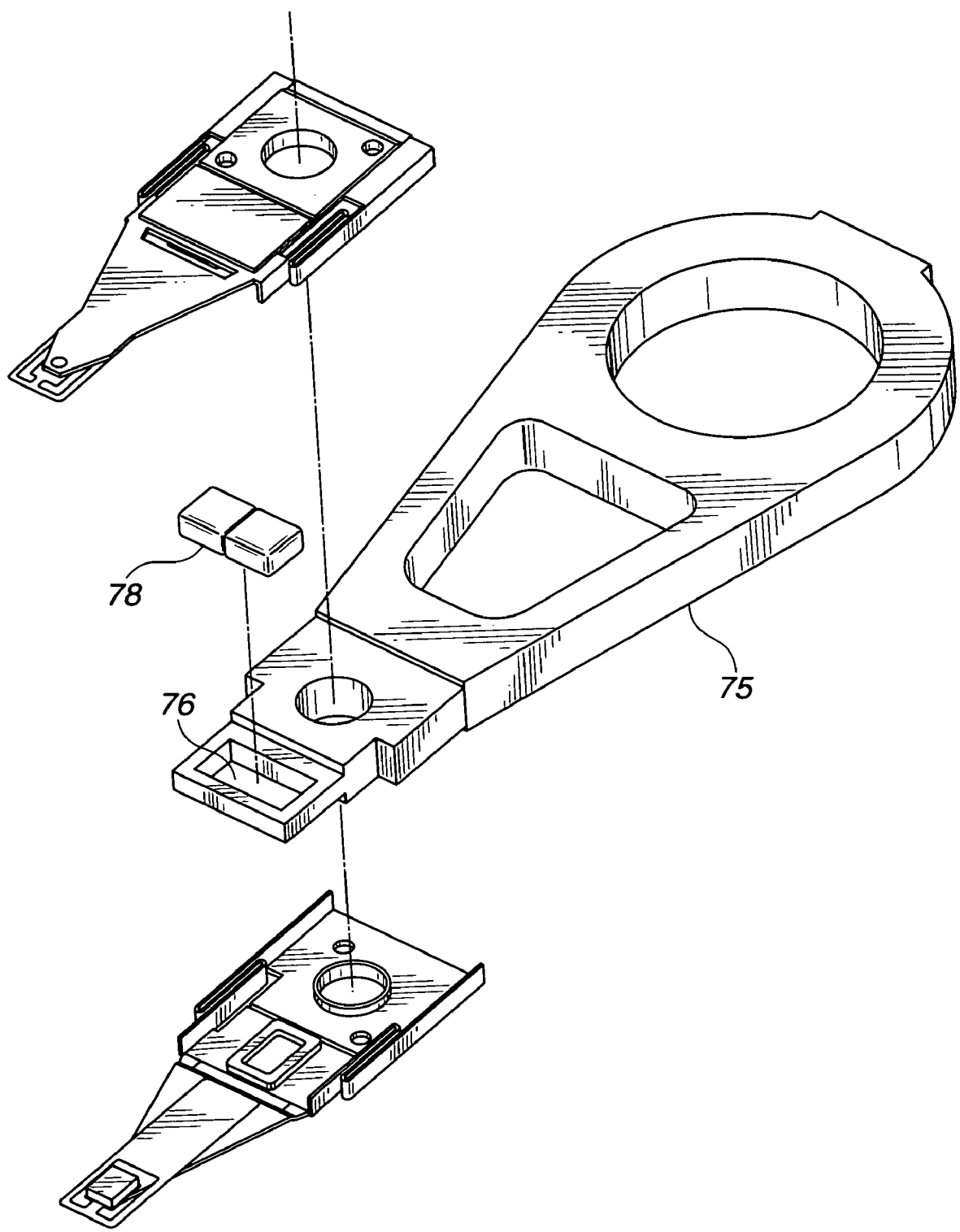
FIG. 9 is a perspective exploded view of a magnetic head actuator in a fourth embodiment of the invention.
Figure 10:
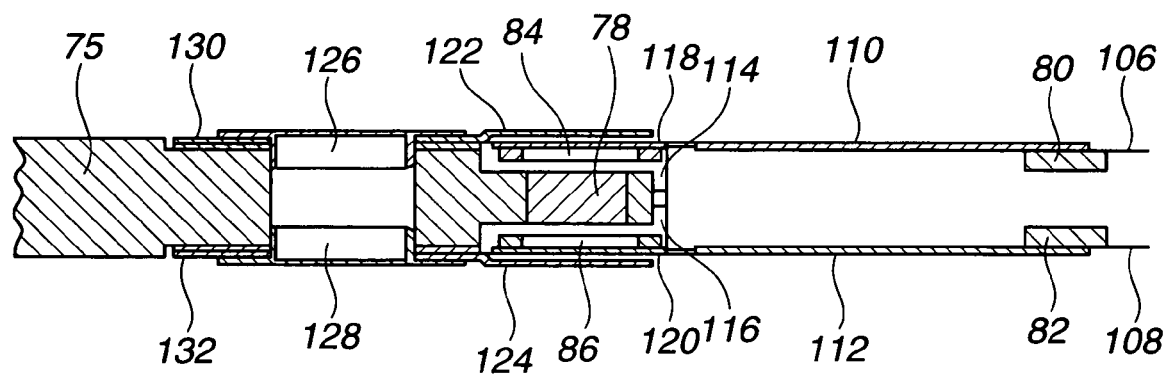
FIG. 10 is a cross-sectional view of the actuator in the fourth embodiment.

FIGS. 9 and 10 are perspective exploded and cross-sectional views of the magnetic head actuator according to a fourth embodiment of the invention, respectively. In the fourth embodiment, the stator section in the third embodiment is replaced by an aperture 76 which penetrates throughout the distal end portion of the VCM arm 75. A permanent magnet 78 is fitted in the aperture 76. As best shown in FIG. 10, the fourth embodiment is advantageous in that when the VCM arm 75 is provided with a pair of magnetic head sliders 80, 82, a pair of rotor sections 84, 86 can be driven by one stator section (permanent magnet 78). Herein, the VCM arm 74 is made of a non-ferromagnetic material for increasing the efficiency of the magnetic circuit. Illustrated in FIG. 10 are suspension gimbals 106, 108, suspension load beams 110, 112, micro-beams 114, 116, rotor sections 118, 120, auxiliary yokes 122, 124, caulking stakes 126, 128, and VCM arm attachment sections 130, 132. If desired, the member 72 having a suspension load beam section integrated therewith as described in the second embodiment may also be used in the fourth embodiment.

Figure 11:
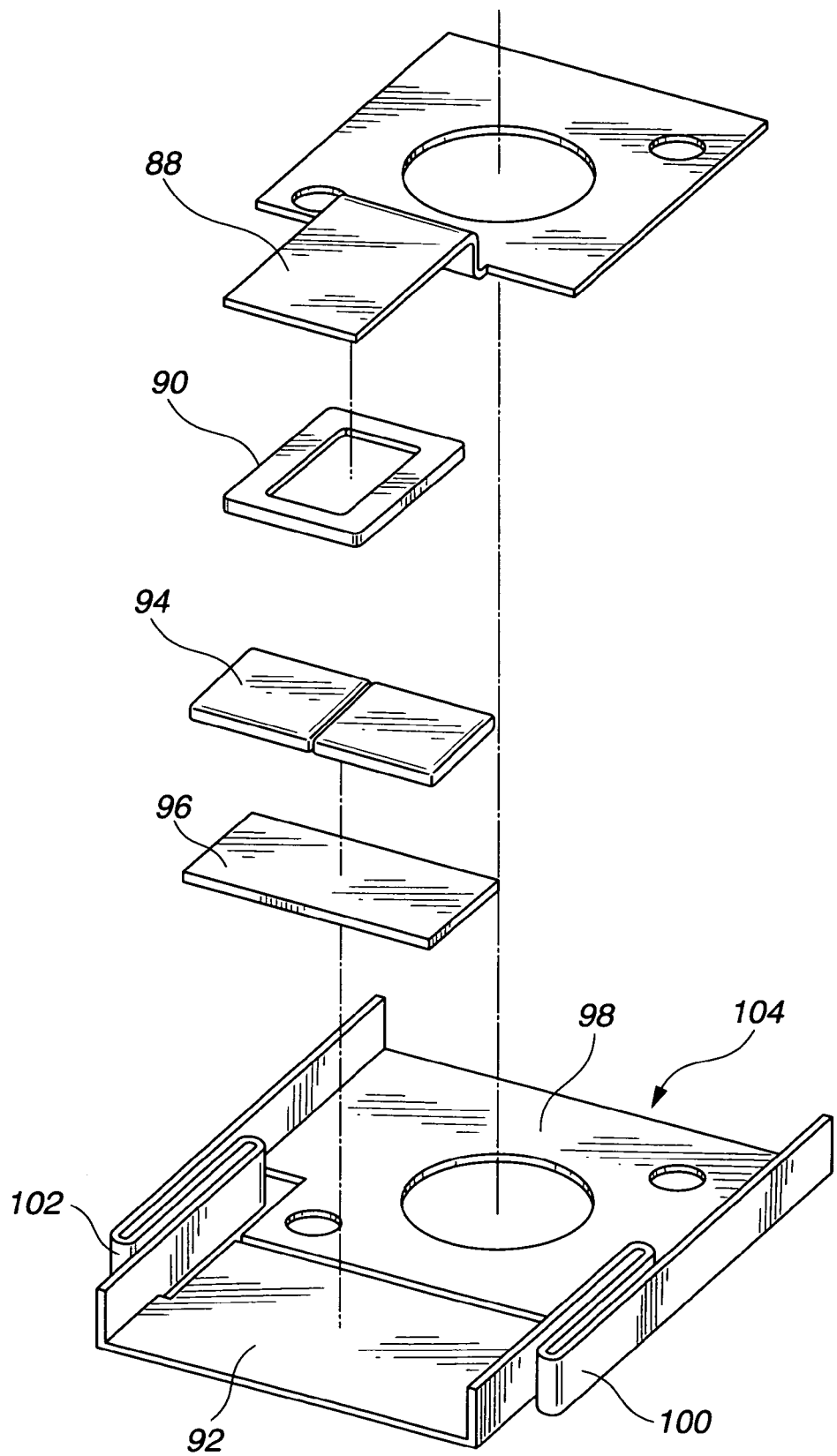
FIG. 11 is a perspective exploded view of a magnetic head actuator in a fifth embodiment of the invention.

FIG. 11 is a perspective exploded view of the magnetic head actuator according to a fifth embodiment of the invention. In the fifth embodiment, a coil 90 is disposed in a stator section 88, and a permanent magnet 94 is disposed in a rotor section 92. Since the coil 90 from which a power supply wire extends is placed in the stator section 88 which is stationary, the wiring is simplified. In the fifth embodiment, a member 104 including a VCM arm attachment section 98, micro-beams 100, 102 and a rotor section 92 is made of a ferromagnetic material for increasing the efficiency of the magnetic circuit. Alternatively, a yoke 96 made of a ferromagnetic material may be disposed between the permanent magnet 94 and the rotor section 92. The arrangement of the permanent magnet in the rotor section is also applicable to the second to fourth embodiments.

Japanese Patent Application No. 2003-408829 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A magnetic head actuator in a magnetic disk drive unit, which is mounted at a distal end of an arm extending from a voice coil motor, and coupled to a suspension having a magnetic head slider mounted at its distal end for providing swing motion of the slider, said actuator comprising:

a stator section secured to the arm distal end;

an attachment section secured to the arm distal end together with the stator section;

metallic micro-beams extending from the attachment section and shaped by bending, each of the micro-beams including at least one fold;

a rotor section supported for swing motion by the micro-beams;

a permanent magnet disposed in the stator or rotor section; and a coil disposed in the rotor or stator section, wherein electric current is conducted through the coil in the magnetic field created by the permanent magnet for causing the micro-beams to be displaced for inducing swing motion of the suspension secured to the rotor section and the magnetic head slider mounted thereon.

2. The magnetic head actuator of claim 1, wherein a pair of said micro-beams are disposed at opposite sides of the rotor section for supporting the suspension and the magnetic head slider via the rotor section, and said micro-beams are flexible enough to be displaced by a drive force developed between the stator and rotor sections in a tracking direction on the magnetic disk, but highly stiff in other directions.

3. The magnetic head actuator of claim 1, wherein the arm from the voice coil motor is provided at its distal end with one stator section and two sets of said micro-beams, rotor sections and suspensions which are symmetrically arranged so as to interpose the arm between the sets.

4. The magnetic head actuator of claim 1, wherein said micro-beams are formed integrally with the arm attachment section and the rotor section.

5. The magnetic head actuator of claim 1, wherein said suspension includes a load beam section, and said micro-beams are formed integrally with the arm attachment section, the rotor section and the load beam section.

6. The magnetic head actuator of claim 1, wherein said stator section is made of a ferromagnetic material.

7. The magnetic head actuator of claim 1, wherein said stator section is formed integrally with the arm, and the arm is made of a ferromagnetic material.

8. The magnetic head actuator of claim 1, wherein said rotor section is made of a ferromagnetic material.

9. A magnetic head actuator in a magnetic disk drive unit, which is mounted at a distal end of an arm extending from a voice coil motor, and coupled to a suspension having a magnetic head slider mounted at its distal end for providing swing motion of the slider, said actuator comprising:

a stator section secured to the arm distal end;

an attachment section secured to the arm distal end together with the stator section;

metallic micro-beams extending from the attachment section and shaped by bending;

a rotor section supported for swing motion by the micro-beams;

a permanent magnet disposed in the stator or rotor section;

a coil disposed in the rotor or stator section; and an auxiliary yoke opposed to said stator section for forming a magnetic circuit, with said rotor section being interposed between the auxiliary yoke and said stator section, wherein electric current is conducted through the coil in the magnetic field created by the permanent magnet for causing the micro-beams to be displaced for inducing swing motion of the suspension secured to the rotor section and the magnetic head slider mounted thereon.

10. The magnetic head actuator of claim 1 or 9, wherein each of the micro-beams is extended from the attachment section toward the rotor section, then folded back toward the attachment section, and further folded toward the rotor section.

11. The magnetic head actuator of claim 1 or 9, wherein the micro-beams are formed by a method comprising the steps of:

providing a blank, the blank having the attachment section, the rotor section, and side strips being at laterally opposed sides each other and connecting the attachment section and the rotor section;

folding the side strips at an angle of about 180° so that the rotor section overlies the attachment section;

folding the side strips back at an angle of about 180° so that an inside edge of the rotor section is situated close to an inside edge of the attachment section; and subsequently folding the side strips along their longitudinal direction at approximately right angles so as to form the micro-beams.

12. A magnetic disk drive unit comprising a voice coil motor for rotating a pivot shaft, a voice coil motor arm having a proximal end pivoted to the pivot shaft and a distal end, a magnetic head actuator fixedly secure to the distal end of the arm, a suspension coupled to the actuator and including a load beam and gimbal, and a slider mounted on the suspension at its distal end and having a magnetic bead carried thereon, the voice coil motor operating to pivotally move the arm for positioning the slider at a selected track on a magnetic disk, wherein said magnetic bead actuator comprises a member including an attachment section secured to the arm distal end, micro-beams and a rotor section where a coil or a permanent magnet is disposed, a stator section where a permanent magnet or a coil is disposed, and an auxiliary yoke, the permanent magnet, the stator section, and the auxiliary yoke forming a magnetic circuit, the permanent magnet and the coil being opposed to define a small gap therebetween and within the magnetic circuit, and said micro-beams are integrally formed with the arm attachment section of the member at laterally opposed edges and stand along the edges at right angles toward the stator section, and specifically, the micro-beams are formed by furnishing elongated strips extending forward from the front side of the arm attachment section at opposed edges, folding the strips inside an angle of 180° to form a first fold, then folding the strips inside an angle of 180° at a position backward of the attachment section front side to form a second reverse fold and provide the last portions of the strips with which the rotor section is integrally formed through transition portions, wherein when electricity is conducted across the coil in the magnetic field created by the permanent magnet, the rotor section is arcuately moved by Lorentz forces in a lateral direction, so that the suspension and the magnetic head-carrying slider are also arcuately moved together with the rotor section.

13. The magnetic disk drive unit of claim 12, wherein the member including the arm attachment section, micro-beams and rotor section is prepared by furnishing a blank in which the attachment section and the rotor section are bridged at laterally opposed sides by strips, folding inside the strips at a first intermediate point an angle of about 180° so that the rotor section overlies the attachment section, then folding back the strips at a second intermediate point an angle of about 180° so that the rear edge of the rotor section is situated close to the front edge of the attachment section, and finally folding the strips along their longitudinal inner side at right angles toward the stator section.

* * * * *